Oct. 5, 1965 T. PRICKETT, JR., ETAL 3,209,855
METHOD AND MEANS FOR REDUCING STRONG, EARLY ARRIVAL
WAVES IN CONTINUOUS WAVE OPERATIONS
Filed Nov. 1, 1960 3 Sheets-Sheet 1

ATTEST.
Charles F. Steininger

INVENTOR.
Tom Prickett Jr.
John P. Woods.
BY
ATTORNEY.

United States Patent Office 3,209,855
Patented Oct. 5, 1965

3,209,855
METHOD AND MEANS FOR REDUCING STRONG, EARLY ARRIVAL WAVES IN CONTINUOUS WAVE OPERATIONS
Tom Prickett, Jr., Richardson, and John P. Woods, Dallas, Tex., assignors to The Atlantic Refining Company, Philadelphia, Pa.
Filed Nov. 1, 1960, Ser. No. 66,651
3 Claims. (Cl. 181—.5)

This application is a continuation-in-part of co-pending application, Serial No. 453,853, now United States Patent 2,982,371 entitled, "Seismic Exploration Method and Apparatus," hereinafter to be referred to as the basic method.

This invention relates to an improved method and means for reducing early arrival energy during continuous wave seismic wave operations. More specifically, the invention relates to an improved method and apparatus for eliminating early arrival refracted signals and horizontal waves received during continuous wave seismic operations.

Generally, this basic method includes generating a frequency modulated cyclically-varying continuous wave of predetermined periods or period at one point in the surface of the earth, picking up the generated signal at a remote point either at the surface of the earth or down a well bore, picking up the generated signal at a point adjacent the generator and time-delaying this signal in varying amounts, and combining this variably-delayed signal and the remotely received signal in such a manner that only the remotely received signals having the same frequency variations as the time-delay signal and in phase therewith are recorded.

To better understand the present invention, which is an improvement upon the basic method, it is necessary to consider the operation of a device capable of practicing the basic method.

The drawings utilized to illustrate the basic method and the improvements thereto are as follows.

Figure 1:
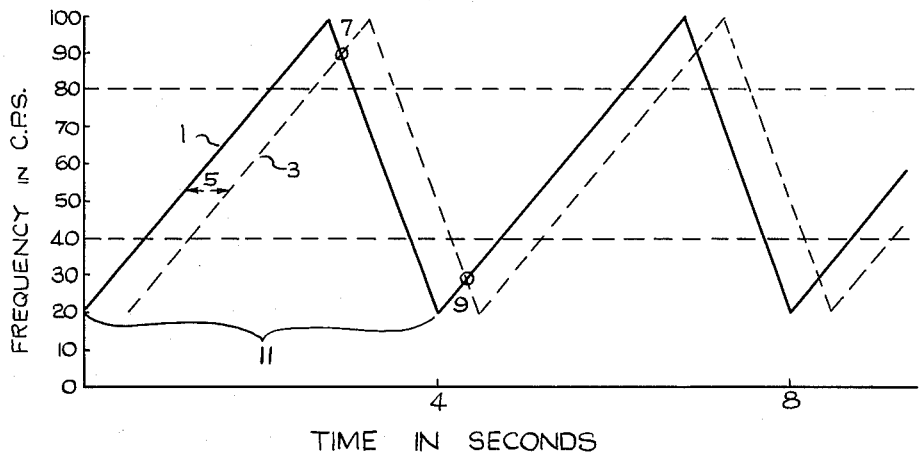
FIGURE 1 is a plot of frequency versus time of a cyclically-varying continuous wave and its delayed counterpart for use in practicing the subject method.

Refer now to FIGURE 1. For purposes of illustration, FIGURE 1 discloses a plot of frequency versus time of a generated cyclically-varying signal 1 and its delayed counterpart signal 3. The delay time 5 between signal 1 and counterpart signal 3 can be varied. Crossover points 7 and 9 are the points of common frequency of signals 1 and 3 at a given delay time 5. Period 11 is the time required for signal 1 to execute a complete sweep of its frequency variation. When a signal is generated having unequal periods, 11 represents the shortest period with respect to time. FIGURE 1 discloses a signal in which all periods 11 are equal in time.

Figure 2:
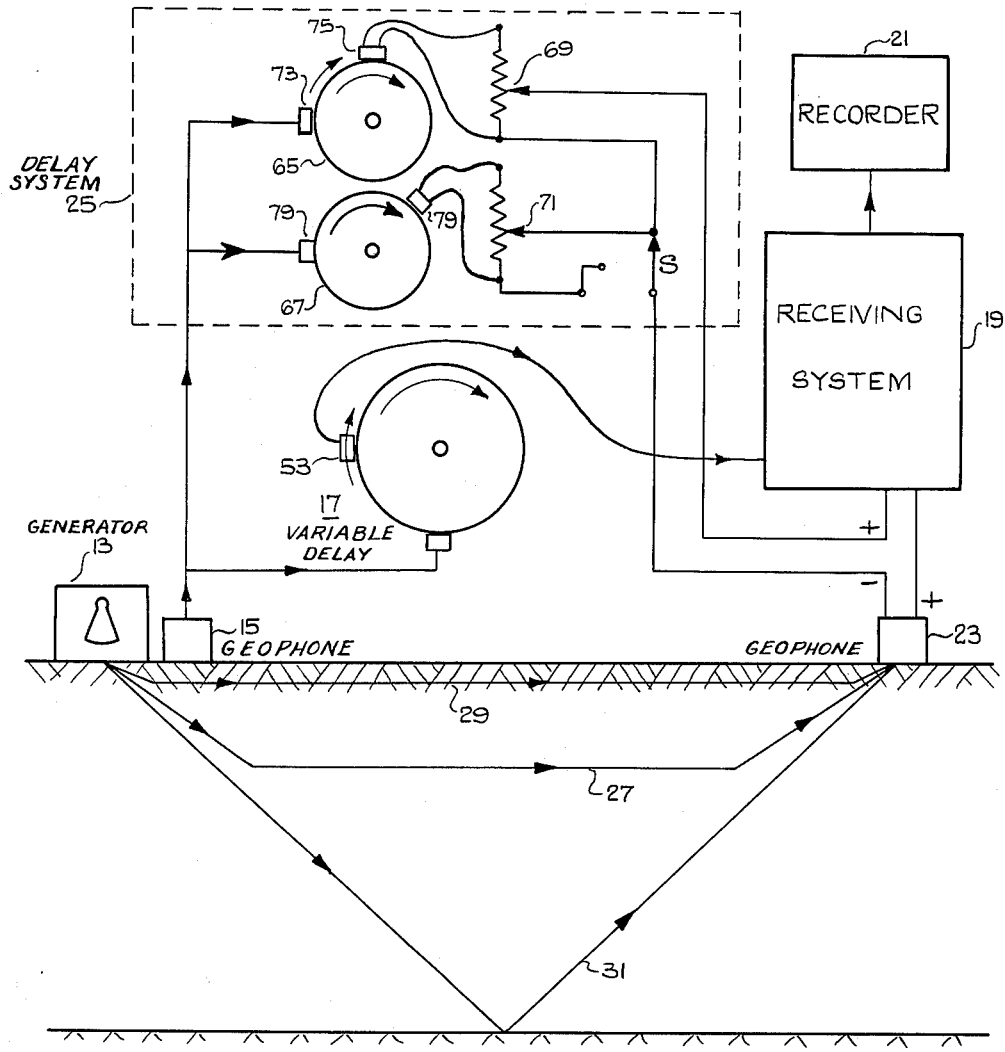
FIGURE 2 is a block diagram of an over-all device capable of practicing the basic method and improvements thereto.

FIGURE 2 discloses in block form a device capable of practicing the subject basic method and the present invention. The drawing includes continuous wave generator 13, geophone 15, variable delay 17, receiver system 19, recorder 21, second geophone 23, and delay system 25. Means 25 represents the improvement to the subject basic invention and will be described in detail hereinafter. Generator 13 produces refracted wave 27, horizontal wave 29, and reflection wave 31.

Figure 3:
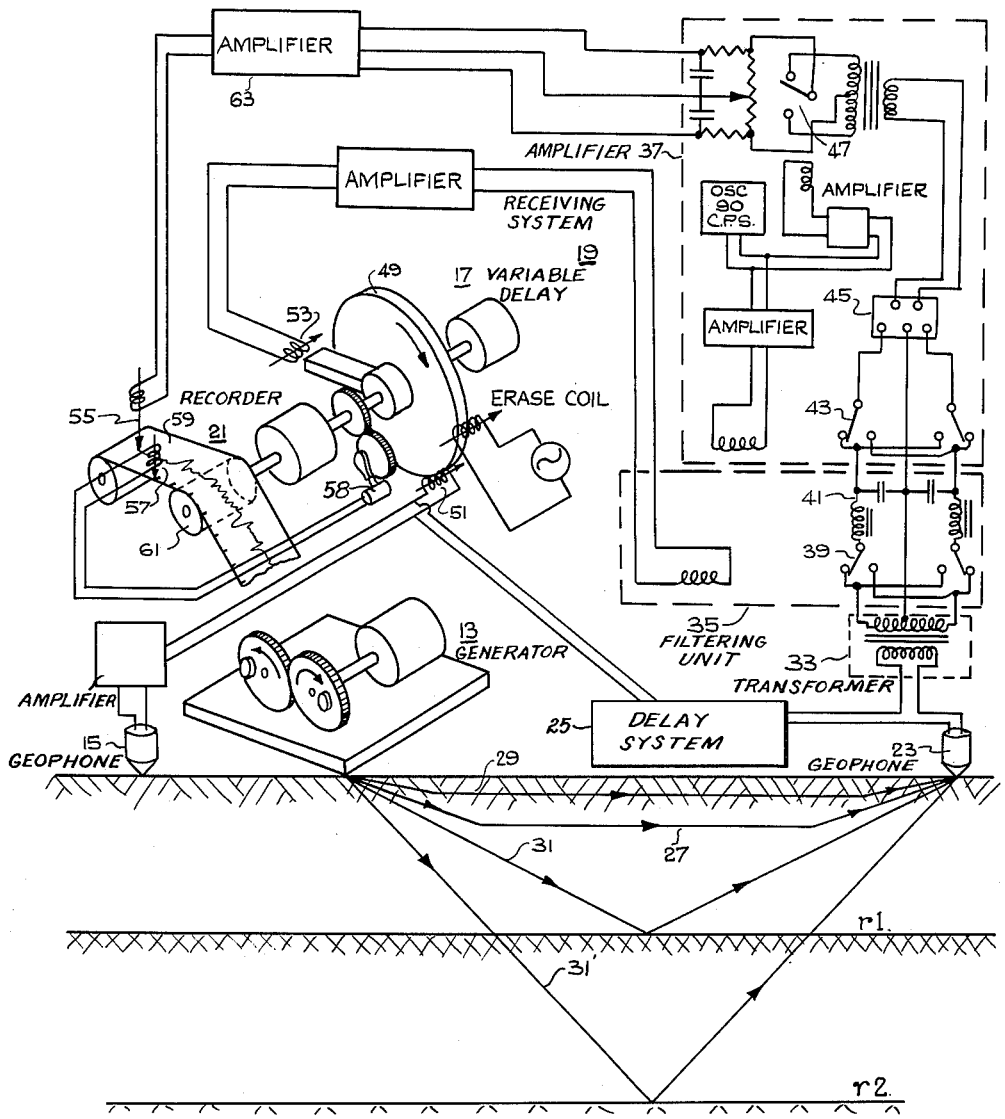
FIGURE 3 is one embodiment of a device capable of practicing the basic method of operation.

Refer now to FIGURE 3 which shows in schematic form a device capable of practicing the basic method of operation. FIGURE 3 contains the same basic elements as shown in FIGURE 2, and these common elements bear similar numbers.

Receiver system 19 can be broken down into three basic parts; i.e., coupling transformer 33, filtering unit 35, and amplifier 37. This particular embodiment utilizes relay 39 and narrow pass band filter 41 in filter system 35. Chopper-type amplifier 37 includes synchronous relay 43, narrow band amplifier 45, and synchronous relay 47. Variable delay 17 includes magnetic drum 49, recording head 51, and rotating pick-up head 53, in which the angular displacement of pickup head 53 denotes the time delay after which a signal recorded by head 51 is picked up. Recorder 21 includes pen 55 for recording the signal, pen 57, for placing timing marks on the record in response to pulses from microswitch 58, chart 59, and drive 61.

Let use now assume that generator 13 is programmed by a device such as disclosed in copending application No. 66,548, a continuation-in-part of United States Patent 2,982,371, owned by a common assignee, to produce a cyclically-varying signal such as one shown in FIGURE 1. Path 27 represents the early refracted wave and path 29 the horizontal wave. Paths 31 and 31' are signals reflected from two beds of interest $r1$ and $r2$. Geophone 23 receives noise and the reflected and refracted waves which are amplified by transformer 33. The combined useful signals and noise are impressed on relay 39. The frequency of relay 39 is controlled by the time-delayed signal received by geophone 15 and time delay unit 17. As pickup head 53 rotates and picks up the signal previously recorded by head 51 after a time delay, it eventually reaches a position where the time delay of the signal it picks up is equal to the travel time of a useful seismic wave picked up by geophone 23. At this point of coincidence, relay 39, which is continuously actuated by the time-delayed signal, converts the frequency-modulated signal representing such useful wave into a low frequency signal. This low frequency signal is passed through low pass narrow band filter 41 and then amplified by means of amplifier units 37 and 63, and recorded by pen 55 as an inflection on recording chart 59. During this operation, the delay entered by pickup head 53 is indicated on chart 59 by time delay marks recorded by head 57. Accordingly, a record is obtained by which the indication of a useful signal can be correlated in respect to the time delay of the time-delayed signal which controls the passing of the useful signal through the low pass narrow band filter. Since the filter unit 35 only passes a signal representing a useful seismic wave when the time delay of pickup head 53 is equal to the travel time of such useful wave, the determination of the time delay of the time-delayed signal controlling filter system 35 at the given instant when a signal is passed by 35, denotes the travel time of the useful seismic wave represented by the recorded signal.

From the detailed discussion above, it is clear that one of the advantages disclosed in the subject basic method is that little or no signal is passed through the receiver 19 unless the delayed signal counterpart is in synchronism with the remotely received signal. Copending application No. 66,549, also a continuation-in-part of application, Serial No. 453,853, now United States Patent 2,982,371, discloses an improved method of preventing the passage of an unwanted signal at crossover points 7 and 9, FIGURE 1 (synchronism at points of common frequency), by limiting the band of frequencies passed to those located between selected frequencies. However, even with the elimination of crossover point interference, the basic method is still troubled by the arrival of strong, early arrival signals such as 27 and 29 which can be confused with, or blank out, reflections from shallow beds of interest. Since these interfering signals cannot be successfully filtered as they contain the same frequencies as the reflected signals, it is necessary to utilize a selective passage system that is compatible with the over-all operation of the basic method of operation.

It is therefore an object of this invention to provide a method and apparatus for selectively eliminating the passage of strong, early arrival, refracted waves and horizontal waves during continuous wave operations.

A further object of this invention is to provide a method and apparatus for eliminating strong, early arrival refracted waves and horizontal waves immediately after being received by a remote seismometer.

A further object of this invention is to provide a method and apparatus for analyzing the arrival of strong, early refracted waves and horizontal waves and producing an effective means for canceling same.

A further object of this invention is to provide at least one variable delay than can be used in a continuous wave operation to cancel out strong, early arrival refracted waves and horizontal waves.

The general arrangement and further objects of our invention may be more readily determined by the discussion to follow:

Briefly, the invention for preventing or reducing strong, early arrival signals includes using the basic method as described in copending application, Serial No. 453,853, now U.S. Patent No. 2,982,371 to determine the travel time of strong, early arrival signals such as early refracted waves and horizontally traveling waves, and utilizing at least one delay system to cancel the selected strong arrival signal or signals immediately after being detected by a remote seismometer.

The invention can be practiced in various ways so long as a suitable delay system or bank of delay systems are connected in a manner to operate on the remotely received signals prior to their passage through the novel receiving system 19 disclosed in the basic method application.

Referring more specifically to FIGURE 2, assume that it is desirable to eliminate the recording of early arriving refracted wave 27 and horizontally traveling wave 29 which would normally be recorded in the basic method. Vibrator 13 is actuated to produce the desired cyclically-varying signal 1 as disclosed in FIGURE 1. The generated signals are picked up at a remote point either at the surface by geophone 23 (or by a receiver down a well bore such as disclosed in United States Patent 2,982,371) and by adjacent geophone 15. Delay system 17 variably delays the signal picked up by 15 and combines same in receiving system 19 with signals received by geophone 23. As disclosed in the description of FIGURE 3, the various received signals 27, 29, 31, etc., are passed as the delayed signal from geophone 15 is brought into synchronism with each of the signals. As also discussed in the basic method, the passage of each signal is measured by recorder 21 or by a meter with its appropriate two-way travel time. Generally speaking, the first strong, early arrival signal is refracted wave 27 followed by horizontally-traveling wave 29. Depending on the geological configuration of the area being explored, various other early arrival refracted waves may be present and recorded by 21.

One of the most difficult problems in the use of continuous wave systems concerns the elimination of these strong, early arrival signals. Applicants have devised a novel variable delay or bank of variable delays for use with the basic method to cancel one or more of the early arrival signals before they can be passed by receiving system 19. Block 25 must have one delay means for each early arrival signal to be canceled. For purposes of illustration, 25 shows two delay means to indicate that any desired number of delays can be used as indicated. If two delays are used, dotted switch "S" is moved to place the second delay in operation.

After the above-mentioned continuous wave signal has been generated and recorded over a period of time, the record made by 21, FIGURE 2, is inspected and the travel time or times of the undesired early arrival signal or signals are used to establish the delay or delays to be set in block 25. Assuming that it is desirable to eliminate early arrival refracted signal 27 and horizontally-traveling signal 29, it is necessary to utilize a bank of two delay means in block 25 to include first delay drum 65 and second delay drum 67. Necessary amplitude adjustments are made by potentiometers 69 and 71. Let us assume that the two-way travel time of refracted signal 27 is one second and that the travel time of 29 is 1.5 seconds. Pickup head 53 on main delay system 17 is set to first arrival of one second. Next, delay drum 65 is set to enter one second of delay and potentiometer 69 is adjusted until output of recorder 21 is zero. This cancels the signal from geophone 23. The same operation is repeated for delay drum 67, except a delay time of 1.5 seconds is entered on delay system 17 and delay drum 67 and potentiometer 71 is used to cancel the signal. In both cases, the receiving system is used as a null detector.

The device is now capable of conducting continuous wave operations without recording early arrival interference from refracted wave 27 and horizontal wave 29. In operation, the cyclically-varying signal received by geophone 15 is fed in parallel into the desired number of delays in bank 25. In this case, the generated wave is fed in parallel to and delayed by drum 65 an amount equal to the travel time of refracted wave 27, and fed in parallel to and delayed by drum 67 an amount equal to the travel time of wave 29. These delayed amplitude adjusted signals are inverted in polarity, and fed into the output of seismometer 23 in a manner to cancel the arrival of newly received waves 27 and 29. The cyclically-varying signal received by geophone 15 is also fed in parallel to and delayed by drum 17. However, this drum variably delays the signal as it passes to receiver 19 as described in the basic method. With the bank of delays in operation, seismometer 23 continues to receive all signals from generator 13 and the input of receiving system 19 receives all the reflected signals and the refracted signals not canceled by delay system 25.

Although the method and apparatus have been illustrated for operation on seismic data, it is obvious that it is just as appropriate for well velocity operations and other exploration operations such as disclosed in United States Patent 2,982,371 requiring the elimination of strong, early arrival signals. Therefore, it is to be observed that, although the specific embodiments of the instant invention have been illustrated and described herein, various modifications and substitutions may be made which will be obvious to those skilled in the art without departing from the scope of the present invention which is limited only by the appended claims.

We claim:

1. The method of obtaining geophysical measurements comprising the steps of
    (a) generating in the earth useful seismic waves of cyclically varying frequency,
    (b) receiving by means of a geophone said useful waves and noise accompanying said waves at a location remote from the source of said generated waves after a time interval later than the time when said waves were generated, said time interval being equal to the travel time of said useful seismic waves to the receiver,
    (c) transforming said waves and noise received by said receiver into a first electrical signal,
    (d) producing a second electrical signal having a frequency in respect to time substantially in phase with the varying frequency of said generated useful seismic waves,
    (e) continuously time delaying said second electrical signal,
    (f) filtering said first signal by means of a narrow band filter in order to separate the portion of the signal representing the useful seismic wave from the portion of the signal representing said noise, (g) controlling the frequency band of said filter by means of said time delayed second signal, (h) measuring the amplitudes of early arriving signals passed by said filter simultaneously with the time delay of said second time delayed signal to determine the travel times of said early arriving signals, (i) repeating steps (a) through (g) while simultaneously time delaying a parallel output of said second electrical signal by at least one fixed amount equal to the measured travel time of one of said early arriving signals, mixing said delayed parallel output with said first electrical signal to cancel said one of said early arriving signals prior to its passage to said filter, and measuring the amplitudes of the useful seismic signals passed by said filter along with the time delays of the variably time delayed portion of said second electrical signal.

2. In apparatus for obtaining geophysical measurements comprising (a) means for generating in the earth useful seismic waves of cyclically varying frequency, (b) a geophone located at a place remote from the source of said generated waves for receiving said useful waves and noise accompanying said waves, and for transforming said useful waves and noise into a first electrical signal, and (c) measuring means for measuring the amplitude of said first electrical signal, (d) means for producing a second electrical signal having a frequency in respect to time substantially in phase with the varying frequency of said generated useful seismic waves, (e) a first continuously variable time delay means for time delaying said second electrical signal, (f) a filter unit electrically connected between said measuring means and said geophone for filtering the noise from said first signal in order to separate the portion of said first signal representing the useful seismic wave and pass such portion to said measuring means, said filter unit and said first time delay being electrically connected whereby the time delay of said second time delayed signal controls the band of frequencies passed by said filter unit, (g) means for determining the instantaneous time delay of said second time delayed signal in order to correlate said time delay with the instantaneous amplitude of the signal passed by said filter and measured by said measuring means, and (h) at least one second time delay means, adapted to introduce a predetermined fixed delay, whose input is a third electrical signal equivalent to said second electrical signal and whose output is connected in opposition to the output of said remote geophone at a point prior to the passage of said output of said remote geophone to said filter.

3. In an apparatus as set forth in claim 2 wherein the second time delay means and the first time delay means are connected to a common input and said second time delay means and the geophone are connected in series.

References Cited by the Examiner
UNITED STATES PATENTS

| | | | |
|---|---|---|---|
| 2,275,735 | 3/42 | Cloud | 181—0.5 |
| 2,275,736 | 3/42 | Cloud | 181—0.5 |
| 2,355,826 | 8/44 | Sharpe | 181—0.5 |
| 2,521,130 | 9/50 | Scherbatskoy | 181—0.5 |
| 2,688,124 | 8/54 | Doty et al. | 181—0.5 |

SAMUEL FEINBERG, *Primary Examiner.*

BENJAMIN A. BORCHELT, CHESTER L. JUSTUS, CARL W. ROBINSON, *Examiners.*

UNITED STATES PATENT OFFICE
CERTIFICATE OF CORRECTION

Patent No. 3,209,855                                October 5, 1965

Tom Prickett Jr., et al.

It is hereby certified that error appears in the above numbered patent requiring correction and that the said Letters Patent should read as corrected below.

Column 2, line 16, for "use" read -- us --; column 3, line 71, strike out "dotted".

Signed and sealed this 17th day of May 1966.

(SEAL)
Attest:

ERNEST W. SWIDER                             EDWARD J. BRENNER
Attesting Officer                               Commissioner of Patents